(12) United States Patent
Mashimo et al.

(10) Patent No.: US 6,847,712 B2
(45) Date of Patent: Jan. 25, 2005

(54) RESERVATION SYSTEM AND METHOD

(75) Inventors: Takeshi Mashimo, Yokohama (JP); Takatoshi Kaneko, Yokohama (JP)

(73) Assignee: Hitachi, Ltd., Tokyo (JP)

(*) Notice: Subject to any disclaimer, the term of this patent is extended or adjusted under 35 U.S.C. 154(b) by 119 days.

(21) Appl. No.: 10/409,596

(22) Filed: Apr. 9, 2003

(65) Prior Publication Data

US 2004/0008832 A1 Jan. 15, 2004

Related U.S. Application Data

(63) Continuation-in-part of application No. 10/207,171, filed on Jul. 30, 2002, now Pat. No. 6,782,092.

(30) Foreign Application Priority Data

Aug. 1, 2001 (JP) .......................................... 2001-232983

(51) Int. Cl.$^7$ ................................................ H04M 3/00
(52) U.S. Cl. .............................. 379/265.09; 379/210.01
(58) Field of Search ....................... 379/265.09, 210.01, 379/265.02, 309, 265.01

(56) References Cited

U.S. PATENT DOCUMENTS 6,611,867 B1 * 8/2003 Bowman-Amuah ......... 709/224

FOREIGN PATENT DOCUMENTS

JP          2001-53884          2/2001

* cited by examiner

Primary Examiner—Creighton Smith
(74) Attorney, Agent, or Firm—McDermott Will & Emery LLP

(57) ABSTRACT

A reservation system and method are provided that allow a user, who wants to receive a telephone inquiry or consultation service but cannot get through because an operator's line is busy, to reliably receive the service by making a callback reservation with a time or condition specified over the Internet without needing further telephone calls. The user enters customer information, such as a customer ID, name, and telephone number, and a reservation time or a reservation condition and makes a reservation. A reservation acceptance unit accepts the reservation from the user and notifies the user of reservation completion. When a user-specified time has come or a user-specified condition is satisfied, a reservation monitor unit notifies an operator of the reservation request to prompt the operator to call up the user. After the operator starts request processing, a reservation-request-processing update unit updates a processing status of the reservation request.

5 Claims, 23 Drawing Sheets

FIG.5
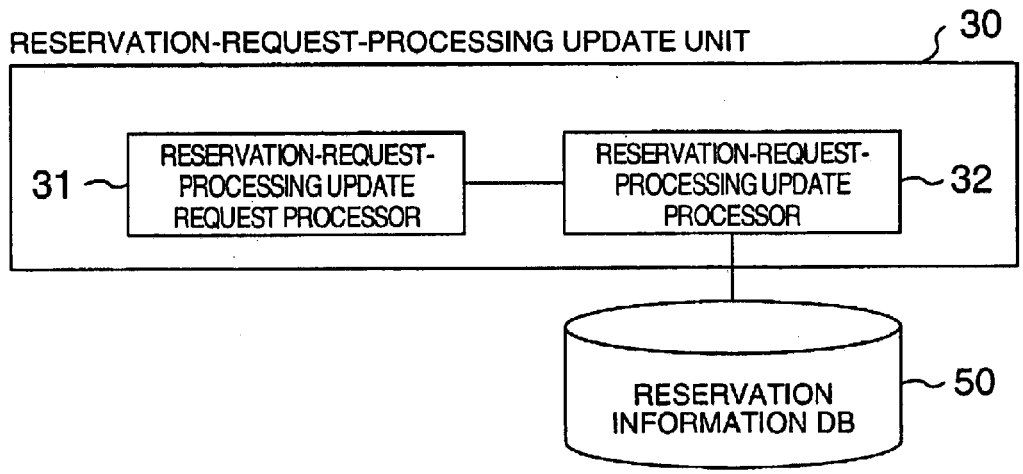
FIG.6
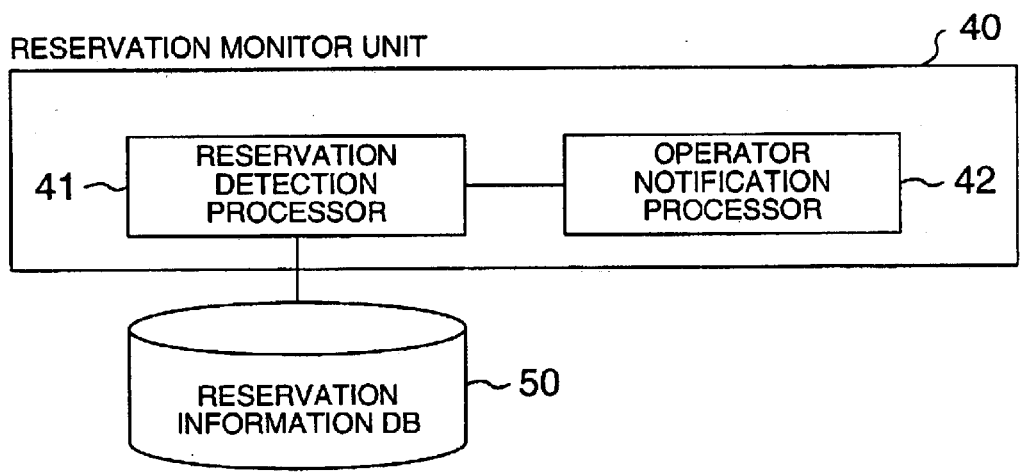
FIG.7
CONTENTS OF RESERVATION INFORMATION DB
| 51 | 52 | 53 | 54 | 55 | 56 |
|---|---|---|---|---|---|
| RESERVATION ID | CUSTOMER ID | CUSTOMER NAME | TELEPHONE NO. | RESERVATION TIME/ CONDITION | PROCESSING STATUS |
| ⋮ | ⋮ | ⋮ | ⋮ | ⋮ | ⋮ |

FIG.8

RESERVATION STATUS SCREEN

MARCH 1ST (THURSDAY)

| 9:00 | 10:00 | 11:00 | 12:00 | 13:00 | 14:00 | 15:00 | 16:00 | 17:00 |
|---|---|---|---|---|---|---|---|---|
| RE-SERVED | RE-SERVED | FREE | RE-SERVED | RE-SERVED | FREE | RE-SERVED | FREE | RE-SERVED |
| RE-SERVED | RE-SERVED | FREE | RE-SERVED | FREE | RE-SERVED | FREE | FREE | RE-SERVED |
| FREE | FREE | FREE | RE-SERVED | RE-SERVED | FREE | FREE | FREE | RE-SERVED |

CUSTOMER ID
NAME
TELEPHONE NUMBER

ENTER DETAILED RESERVATION CONDITION

RESERVE

FIG.9

DETAILED RESERVATION CONDITION ENTRY SCREEN

IMMEDIATELY — SET

ANY TIME AFTER [ ] — SET

ANY TIME FROM [ ] TO [ ] — SET

OTHERS [ ] — SET

FIG.10

RESERVATION CONFIRMATION SCREEN

| | |
|---|---|
| CUSTOMER ID | XXXXXXXXX |
| NAME | XXXXXXXXX |
| TELEPHONE NUMBER | XXX-XXX-XXXX |
| RESERVATION TIME | 13:00 ON MARCH 1ST (THURSDAY) |

CONFIRM RESERVATION. OK?

[ OK ]~301    [ CANCEL ]~302

FIG.11

RESERVATION COMPLETION SCREEN

RESERVATION COMPLETED

RESERVATION ID    XXXXXXXXXX

FIG.12

RESERVATION REQUEST PROCESSING STATUS SCREEN

MARCH 1ST (THURSDAY)

| | 9:00 | 10:00 | 11:00 | 12:00 | 13:00 | 14:00 | 15:00 | 16:00 | 17:00 |
|---|---|---|---|---|---|---|---|---|---|
| RESERVATION ID | XXXX | XXXX | FREE | XXXX | XXXX | FREE | XXXX | FREE | XXXX |
| PROCESSING STATUS | PROC-ESSED | IN PROC-ESS | | UNPROC-ESSED | UNPROC-ESSED | | UNPROC-ESSED | | UNPROC-ESSED |
| OPERATOR | XXXX | XXXX | | | | | | | |
| RESERVATION ID | XXXX | XXXX | FREE | FREE | FREE | FREE | XXXX | FREE | FREE |
| PROCESSING STATUS | PROC-ESSED | UNPROC-ESSED | | | | | UNPROC-ESSED | | |
| OPERATOR | XXXX | XXXX | | | | | | | |

FIG.13

RESERVATION REQUEST PROCESSING UPDATE SCREEN ~600

| | |
|---|---|
| RESERVATION ID | XXXXXXXX |
| CUSTOMER ID | XXXXXXXX |
| NAME | XXXXXXXX |
| TELEPHONE NUMBER | XXX-XXX-XXXX |
| RESERVATION TIME | 13:00 ON MARCH 1ST (THURSDAY) |
| CURRENT STATUS | UNPROCESSED |

[START PROCESSING] ~601

---

RESERVATION REQUEST PROCESSING UPDATE SCREEN ~604

| | |
|---|---|
| RESERVATION ID | XXXXXXXX |
| CUSTOMER ID | XXXXXXXX |
| NAME | XXXXXXXX |
| TELEPHONE NUMBER | XXX-XXX-XXXX |
| RESERVATION TIME | 13:00 ON MARCH 1ST (THURSDAY) |
| CURRENT STATUS | IN PROCESS |

[UPDATE DATA] ~602    [COMPLETE PROCESSING] ~603

FIG.14

CALLBACK NOTIFICATION SCREEN

RESERVATION ID      XXXXXXXX
CUSTOMER ID         XXXXXXXX
NAME                XXXXXXXX
TELEPHONE NUMBER    XXX-XXX-XXXX
RESERVATION TIME    13:00 ON MARCH 1ST (THURSDAY)

START PROCESSING — 701

FIG. 22

USER ENTRY SCREEN

* RESERVATION SCREEN *

NAME [ ]
TELEPHONE NUMBER [ ]
MAIL ADDRESS [ ]
SUBJECT DESCRIPTION [ ]
DESIRED CALLBACK DATE/TIME  ● IMMEDIATELY
○ [ ] MONTH [ ] DAY
ANY TIME FROM [ ] TO [ ]
OTHER CONDITIONS [ ]

[OK] 2202    [CANCEL] 2203

MANAGEMENT TABLE IN REQUEST INFORMATION DB  2301
2310

| | | | | | |
|---|---|---|---|---|---|
| DATE INFORMATION | DATE RECEIVED | 2001.06.25 | 2001.06.25 | 2001.06.25 | ... |
| | TIME RECEIVED | 10:35 | 10:42 | 10:51 | ... |
| USER INFORMATION 2320 | RESERVATION ID | 100001 | 100002 | 100003 | ... |
| | USER NAME | TARO YAMADA | HANAKO KIMURA | TOKYO SYSTEM CO. | ... |
| | USER'S TELEPHONE NUMBER | 045-999-1111 | 03-8888-0000 | 03-5555-2222 | ... |
| | USER'S MAIL ADDRESS | aaa@aaa.com | zz@zz.co.jp | NONE | |
| | DESIRED CALLBACK DATE | 2001.06.26 | ANY DAY | 2001.06.25 | |
| | DESIRED CALLBACK TIME | 14:00 | ANY TIME | ANY TIME | |
| | REQUEST CONTENTS CLASSIFICATION 1 | PRODUCT A | PRODUCT B | PRODUCT C | |
| | REQUEST CONTENTS CLASSIFICATION 2 | ERROR | INQUIRY | INQUIRY | |
| | RESERVATION CONTENTS | AT SYSTEM STARTUP, THE DEVICE... | DO NOT UNDERSTAND HOW TO ENTER... | ... | |
| OPERATOR INFORMATION 2330 | OPERATOR NAME | | JIRO HITACHI | TARO HITACHI | |
| | PROCESSING STATUS | UNPROCESSED | PROCESSED | IN PROCESS | |
| | CALLBACK TIME | 2331 | 10:45 | 10:58 | |
| | CALLBACK DURATION | | 11 | | |
| | PROCESSING CONTENTS | | MUST BE SET UP...IN ADVANCE | | |
| | OPERATOR'S COMMENT | | ERROR IN MANUAL DESCRIPTION | | |
| | REMARKS | | | | |
| PRIORITY INFORMATION 2340 | PROCESSING PRIORITY | 3 | 1 | 2 | |

FIG. 25

MANAGEMENT TABLE IN OPERATOR DB

2501

| OPERATOR NAME | TARO HITACHI | JIRO HITACHI | SABURO HITACHI | ... |
|---|---|---|---|---|
| PROCESSING STATUS | READY | BUSY | NOT READY | ... |
| RESERVATION ID OF REQUEST BEING PROCESSED | | 100002 | | ... |
| PROCESSING START TIME | | 10 : 45 | | |
| RESERVATION ID OF PROCESSED REQUEST | 100001 | 99994 | | |
| | 99997 | 99987 | | |
| | 99983 | ... | | |
| | ... | ... | | |
| REMARKS | | | NOT READY BECAUSE OPERATOR IS ABSENT | |

FIG. 28

OPERATOR ENTRY SCREEN

* PROCESSING SCREEN *

RESERVATION ID  1000001
NAME  TARO YAMADA
SUBJECT DESCRIPTION  xxxxxxxxxx
OPERATOR NAME
PROCESSING CONTENTS
COMMENT

[COMPLETE] [UPDATE] [CLOSE]

RESERVATION SYSTEM AND METHOD

CROSS REFERENCE TO RELATED APPLICATION

The present application is a continuation-in-part of U.S. Ser. No. 10/207,171 filed on Jul. 30, 2002 now U.S. Pat. No. 6,782,092.

BACKGROUND OF THE INVENTION

The present invention relates to a reservation system and method, and more particularly to a reservation system and method that allow a user, who wants to receive a telephone inquiry or consultation service but cannot get through because telephone inquiries are concentrated, to reliably receive the service by making a callback reservation with a time and a condition specified over the Internet without having to make further telephone calls.

Conventionally, when a user wants to receive a telephone inquiry or consultation service but cannot get through because the operator's line is busy, the user must call up an operator many times until the user successfully gets through.

In the conventional method described above, the user must call up an operator many times and, until the user successfully gets through, the user cannot receive an inquiry or consultation service. This requires the user to spend time calling up the window repeatedly and sometimes results in the user making complaints about it.

In addition, if the operator's line of a company is busy, the company gives trouble to, and creates dissatisfaction among, the users. This sometimes results in additional costs and a drop in company's credibility among the users. As the prior art, refer to JP-A-2001-53884.

SUMMARY OF THE INVENTION

It is an object of the present invention to solve the problems described above and to provide a system and method that allow a user, who wants to receive a telephone inquiry or consultation service, to reliably receive the service.

To achieve the above objects, the present invention provides a reservation system used by a user for receiving a telephone inquiry or consultation service. The reservation system comprises a reservation acceptance unit that accepts conditions including a reservation time and a reservation condition from a user who will receive a telephone inquiry or consultation service; a reservation status checking unit that displays a reservation status screen in response to a reservation status checking request from an operator who is in charge of receiving inquiries or consultations from the user; a reservation-request-processing update unit that updates a processing status of a reservation request, with the reservation request specified on the reservation status screen, according to an instruction from the operator; and a reservation monitor unit that detects a reservation request reaching a reservation time specified by the user or satisfying a reservation condition specified by the user and that, for the detected reservation request, prompts the operator to call up the user who has made the reservation.

In the above-described reservation system according to the present invention, the reservation status checking unit displays the reservation status screen in response to a reservation status checking request from the user.

In the above-described reservation system according to the present invention, the reservation status screen displays time zones, reservation request IDs reserved in each of the time zones, and processing statuses of reservation requests associated with the IDs, each processing status indicating one of "processed", "in process", and "unprocessed", and the operator may update, through the reservation-request-processing update unit, the processing status of each reservation request from "unprocessed" to "in process" or to "processed" or from "in process" to "processed".

In the above-described reservation system according to the present invention, upon detecting that the reservation time specified by the user has come or the reservation condition specified by the user is satisfied, the reservation monitor unit displays a notification screen prompting the operator to call up the user who has made the reservation, changes the processing status of the reservation request to "in process" when one of operators who view the notification screen points a Start function box on the notification screen and, at the same time, erases the notification screens of other operators.

In the above-described reservation system according to the present invention, the system further comprises a processor that, when making a call to the user for the reservation request, the operator automatically dials a telephone number of the user who has issued the reservation request.

In addition, the present invention provides a reservation method in which a reservation is made by telephone. The reservation method comprises the steps of accepting a callback reservation specifying a reservation time or a reservation condition from a user who receives a telephone inquiry or consultation service; in response to a reservation status checking request from an operator who is in charge of accepting inquiries or consultations, checking a reservation status with a reservation status screen displayed; updating a processing status of a reservation request, with the reservation request specified on the reservation status screen, according to an instruction from the operator; and detecting a reservation request reaching a reservation time specified by the user or satisfying a reservation condition specified by the user and, for the detected reservation request, prompting the operator to call up the user who has made the reservation.

Other objects, features and advantages of the invention will become apparent from the following description of the embodiments of the invention taken in conjunction with the accompanying drawings.

BRIEF DESCRIPTION OF THE DRAWINGS

FIG. 5 is an example of a diagram showing the internal configuration of a reservation-request-processing update unit.

FIG. 6 is an example of a diagram showing the internal configuration of a reservation monitor unit.

FIG. 7 is an example of a diagram showing the contents of a reservation information DB.

FIG. 8 is an example of a diagram showing a user's reservation status screen.

FIG. 9 is an example of a diagram showing a user's detailed reservation condition entry screen.

FIG. 10 is an example of a diagram showing a user's reservation confirmation screen.

FIG. 11 is an example of a diagram showing a user's reservation completion screen.

FIG. 12 is an example of a diagram showing an operator's reservation request processing status screen.

FIG. 13 is an example of a diagram showing an operator's reservation request processing update screen.

FIG. 14 is an example of a diagram showing an operator's notification screen.

FIG. 22 is a diagram showing a screen that receives a reservation request from the user.

FIG. 23 is a diagram showing a management table indicating the contents of a request information DB.

FIG. 25 is a diagram showing a management table indicating the contents of an operator DB.

FIG. 28 is a diagram showing a screen on which an operator enters the result of processing executed for a reservation request.

DESCRIPTION OF THE EMBODIMENTS

An embodiment of the present invention will be described with reference to the drawings.

Figure 1:
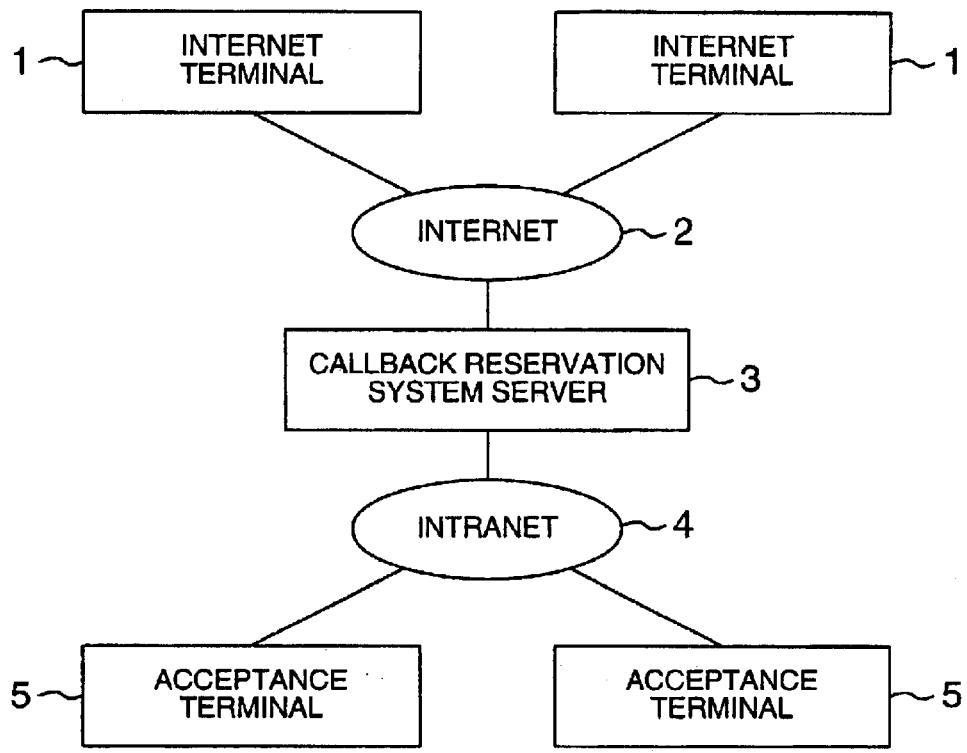
FIG. 1 is an example of a diagram showing the configuration of a reservation system in an embodiment of the present invention.

FIG. 1 is a general diagram of a reservation system in an embodiment of the present invention. A callback reservation system server 3 is a server that controls and manages call back reservations. A user who is going to receive a telephone inquiry service or consultation service uses an Internet terminal 1, connected to an Internet 2, to make a callback reservation or check the reservation status. An operator uses an acceptance terminal 5, connected to an intranet 4, to check the reservation request processing status and process reservation requests.

Figure 2:
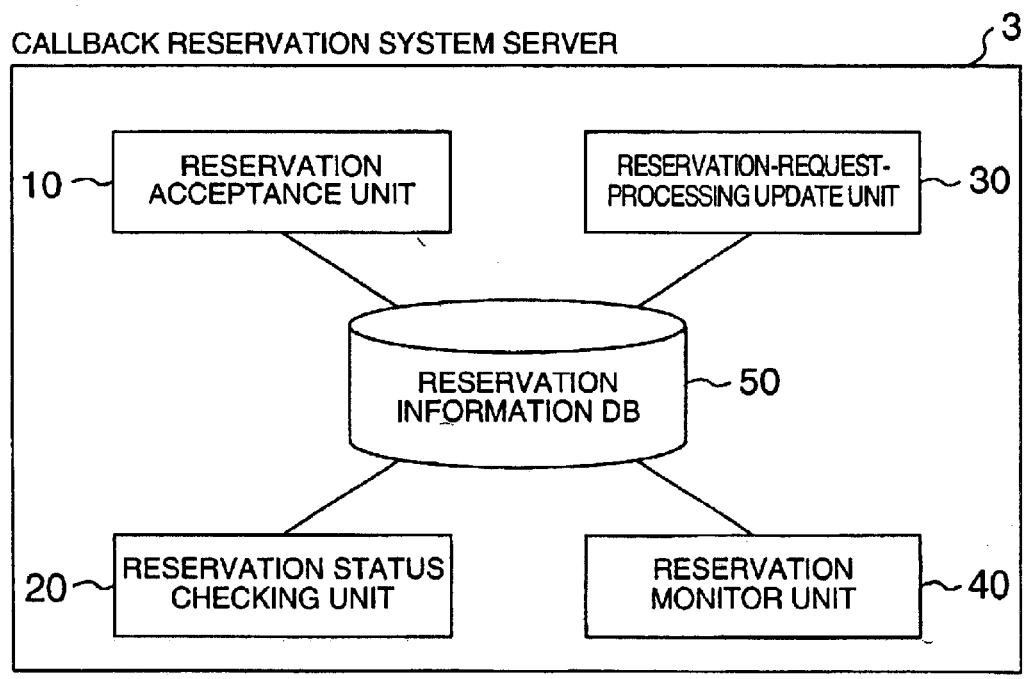
FIG. 2 is an example of a diagram showing the internal configuration of a reservation system server.

FIG. 2 is a diagram showing the internal configuration of the callback reservation system server 3 shown in FIG. 1.

The callback reservation system server 3 comprises functional units, including a reservation acceptance unit 10, a reservation status checking unit 20, a reservation-request-processing update unit 30, and a reservation monitor unit 40, and a reservation information DB (database) 50 accessible to the function units.

The reservation acceptance unit 10 accepts a callback reservation from a user and informs the user that the reservation has been completed. The reservation status checking unit 20 creates a callback reservation status information screen and displays it on the user terminal to allow the user to check the callback reservation status. The reservation status checking unit 20 also creates a reservation request processing status screen and displays it on the operator terminal to allow the operator to check the reservation request processing status. The reservation-request-processing update unit 30 updates the reservation request processing status to allow the operator to start processing for a reservation request, enter the processing status progress, and complete the processing. The reservation monitor unit 40 finds a reservation request that has reached a user-specified time or that satisfies a user-specified condition to prompt an operator to call up the user when the user-specified time has come or the user-specified condition is satisfied. If such a reservation request is found, the reservation monitor unit 40 informs the operator of the reservation request. The reservation information DB 50 is a database that manages reservation information.

FIG. 7 is a diagram showing the contents of the reservation information DB 50. The reservation information DB 50 stores and manages a reservation ID 51 that is unique to each piece of reservation information, a customer ID 52 indicating a number unique to each customer (the customer ID is not a required item in the database because a user without a customer ID may also use the callback reservation system), a customer name 53, a telephone number 54 necessary for an operator to call up a user, a reservation time/condition 55 indicating a time or a condition at or under which the user wants an operator to call up the user, and processing status 56 indicating the current status, or the person in charge, of the reservation request.

Next, with reference to FIGS. 3–6, the configuration of the components of the callback reservation system server 3 in shown in FIG. 2 and their general processing will be described.

Figure 3:
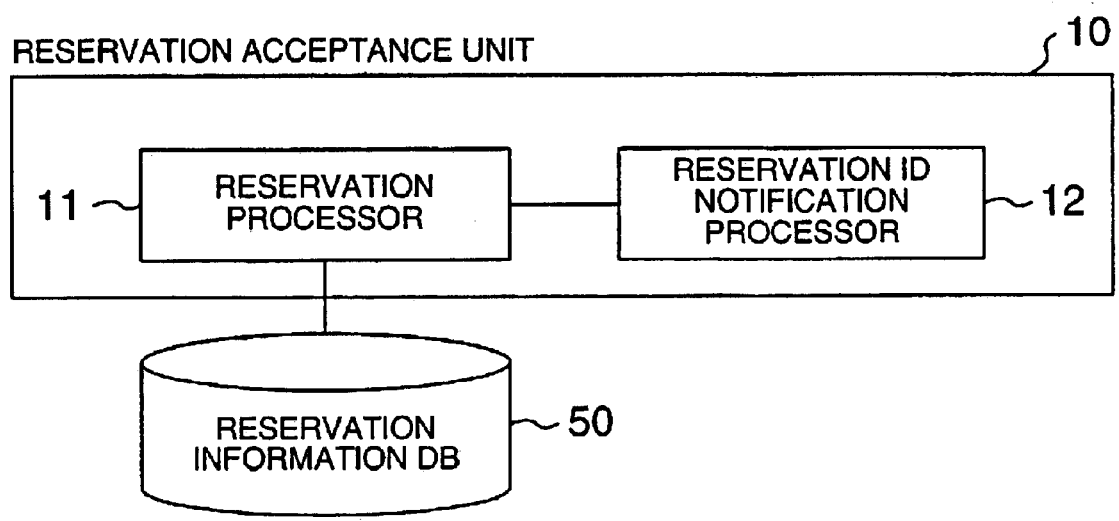
FIG. 3 is an example of a diagram showing the configuration of a reservation acceptance unit.

First, with reference to FIG. 3, the configuration and the general processing of the reservation acceptance unit 10 will be described. The reservation acceptance unit 10 comprises a reservation processor 11 and a reservation ID notification processor 12. The reservation processor 11 accepts a callback request from a user and, to check if the request is acceptable, accesses the reservation information DB 50. If the request is acceptable, the reservation processor 11 assigns a unique reservation ID to the reservation and registers the reservation ID, customer information (customer ID, customer name, and telephone number) and the reservation time/condition with the reservation information DB 50. The reservation ID notification processor 12 notifies the user of the reservation ID assigned by the reservation processor 11.

Figure 4:
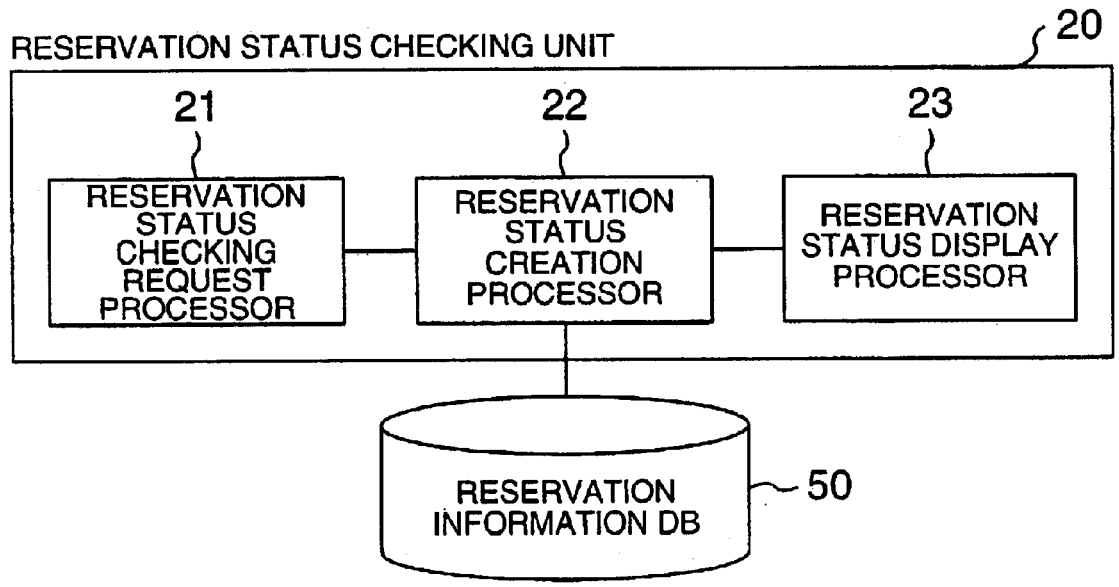
FIG. 4 is an example of a diagram showing the internal configuration of a reservation status checking unit.

Next, with reference to FIG. 4, the configuration and the general processing of the reservation status checking unit 20 will be described. The reservation status checking unit 20 comprises a reservation status checking request processor 21, a reservation status creation processor 22, and a reservation status display processor 23. The reservation status checking request processor 21 accepts a checking request for the reservation status or for the reservation request processing status from a user or an operator. Upon accepting the checking request, the reservation status creation processor 22 creates a reservation status screen or a reservation request processing status screen and causes the reservation status display processor 23 to display the screen on the user terminal or the operator terminal.

The reservation status creation processor 22 accesses the reservation information DB 50 to get information necessary to create the reservation status screen or the reservation request processing status screen. Which screen, that is, user's screen or operator's screen, is created depends on who has made the request, a user or an operator. When a user has made the request, the screen shown in FIG. 8 is created. This user's screen displays only the reservation status only, but not customer information on each reservation request. When an operator has made the request, the screen shown in FIG. 12 is created. This operator's screen displays all information registered with the reservation information DB 50, including the status and the person in charge of each reservation request.

Next, with reference to FIG. 5, the configuration and the general processing of the reservation-request-processing update unit 30 will be described. The reservation-request-processing update unit 30 comprises a reservation-request-processing update request processor 31 and a reservation-request-processing update processor 32. The reservation-request-processing update request processor 31 receives an update request for reservation request processing status from an operator. The contents of the update request from the operator include the start of processing for a reservation request, the progress report on status to date, and the completion of processing. In response to this update request, the reservation-request-processing update processor 32 accesses the reservation information DB 50 and update the processing status.

Finally, with reference to FIG. 6, the configuration and the general processing of the reservation monitor unit 40 will be described. The reservation monitor unit 40 comprises a reservation detection processor 41 and an operator notification processor 42. The reservation detection processor 41 accesses the reservation information DB 50 at a regular interval to detect a reservation request that has reached a specified time or a reservation request that satisfies a specified condition. A reservation request that is detected is notified to the operator by the operator notification processor 42.

Next, referring to the screens shown in FIGS. 8–14 and the flowcharts in FIGS. 15–18, the operation flow of the components included in the callback reservation system server 3 shown in FIG. 2 will be described.

Figure 15:
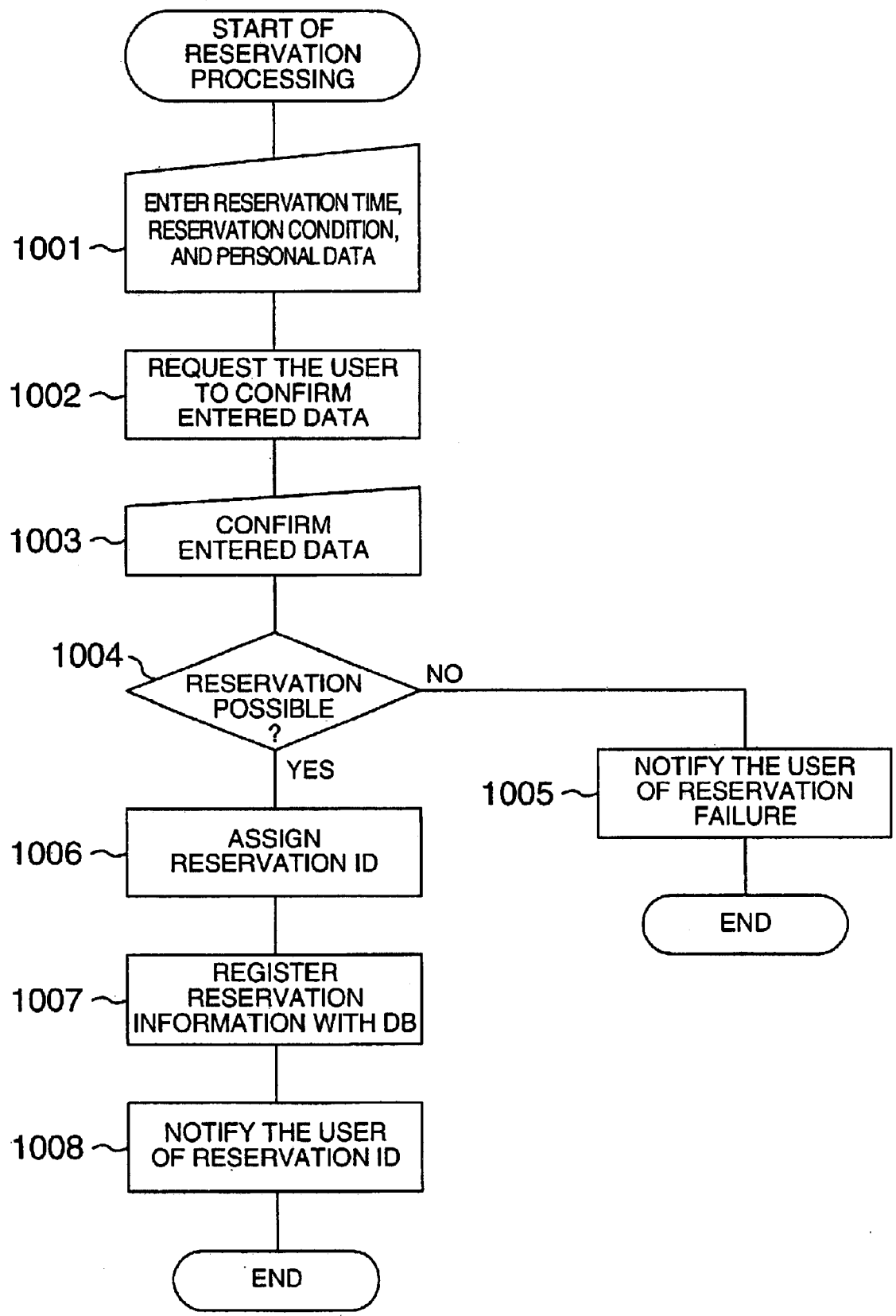
FIG. 15 is an example of a flowchart showing the flow of processing performed when a user makes a reservation.

FIG. 15 is a flowchart showing the flow of processing performed when a user makes a callback reservation. In this flowchart, it is assumed that the user has already issued a reservation status checking request and that the reservation status screen in FIG. 8 is displayed on the user's Internet terminal 1 according to the procedure shown in the flowchart in FIG. 16. The flowchart in FIG. 16 will be detailed later.

FIG. 8 is a diagram showing the reservation status screen displayed on the user's Internet terminal 1. Each time zone button 101 on this reservation status screen 100 indicates the reservation status of the time zone. The user enters customer information, such as the customer ID, name, and telephone number, and a reservation time or a reservation condition through the screen shown in FIG. 8 and then points a Reserve function box 103 (step 1001). Because a user not having a customer ID may also use the callback reservation system, a new user may make a reservation by entering only the name and the telephone number with the customer ID left blank and then pointing the Reserve function box 103.

When the user wants to directly specify a free reservation time on the screen shown in FIG. 8, he or she can specify a reservation time simply by pointing the time zone function box 101 that is indicated as "free". To specify the reservation time and reservation condition more in detail, the user points a function box 102. Then, a detailed reservation condition entry screen 200 shown in FIG. 9 is displayed to allow the user to specify the condition using redundant expressions such as "Any time", "Any time after a specified time", and "Any time from a specified time to another specified time". The user may also specify any condition he or she desires.

After the user enters the time and the condition, the reservation processor 11 displays the reservation confirmation screen shown in FIG. 10 on the Internet terminal 1 to request the user to confirm that the user-entered data contains no error (step 1002). The user checks that the reservation contents contain no error on the screen shown in FIG. 10 and points an OK function box 301 (step 1003).

The reservation processor 11 verifies the entered data to check if it is possible to make a reservation (step 1004). If the entered data contains an error or if the entered data contains no data but another user has already made the reservation, the reservation processor 11 notifies the user that the reservation has field (step 1005) and ends processing. If it is possible to make a reservation, the reservation processor 11 assigns a unique reservation ID to the reservation (step 1006) and registers the reservation ID, customer information (customer ID, customer name, and telephone number), and reservation time/condition with the reservation information DB 50 (step 1007). For the assigned reservation ID, the reservation ID notification processor 12 creates the reservation completion screen shown in FIG. 11, displays the reservation completion screen on the user's Internet terminal 1 (step 1008) and ends processing.

Figure 16:
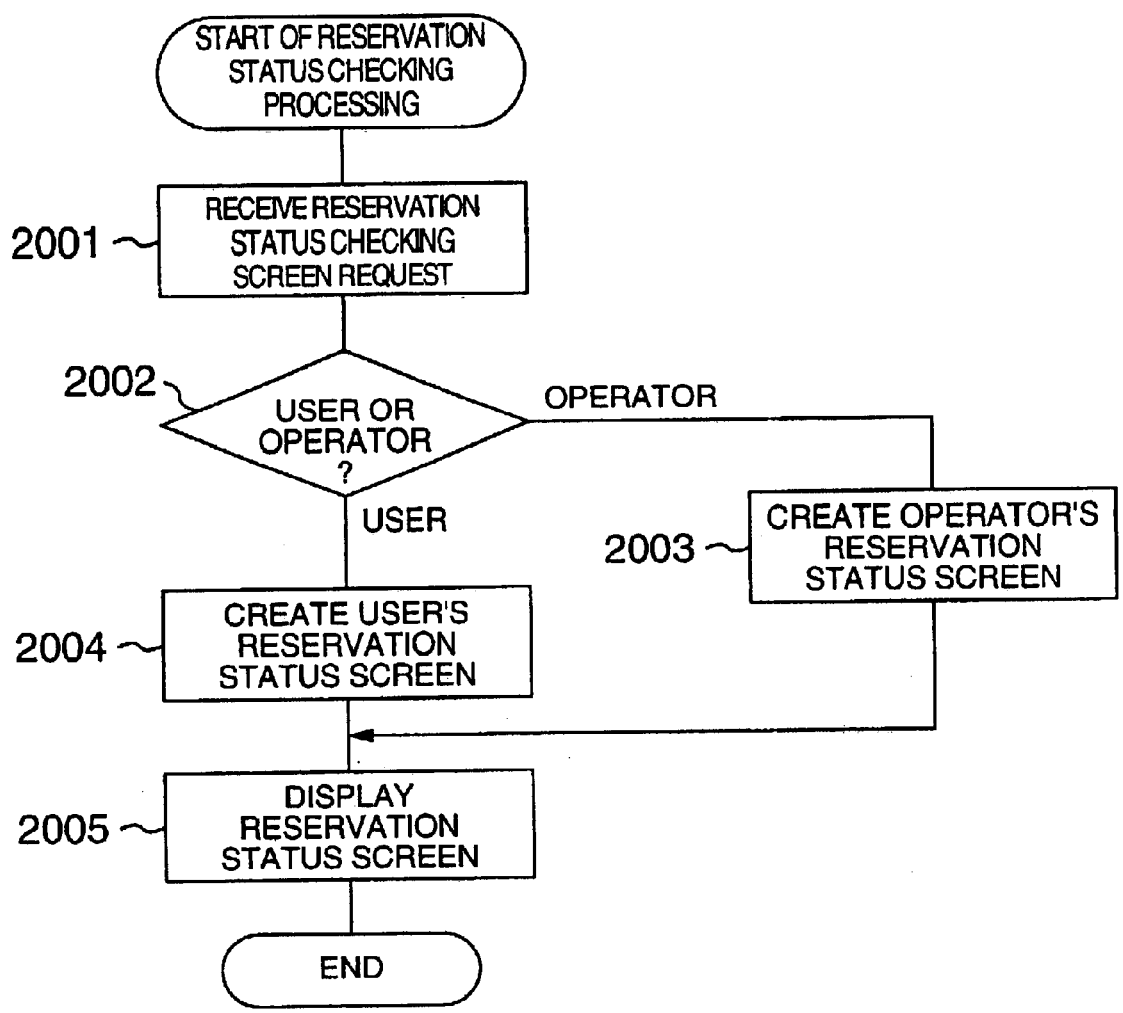
FIG. 16 is an example of a flowchart showing the flow of processing performed when a user or an operator checks reservation status or reservation request processing status.

FIG. 16 is a flowchart showing the flow of processing when a user or an operator checks the reservation status or the reservation request processing status.

First, the flow of processing performed when a user checks the reservation status or the reservation request processing status. The user issues a reservation status checking request from the Internet terminal 1 to the reservation status checking request processor 21, and the reservation status checking request processor 21 receives this checking request (step 2001). In response to the checking request, the reservation status checking request processor 21 checks who has issued the request, a user or an operator (step 2002). If it is found that a user has issued the request, the reservation status checking request processor 21 requests the reservation status creation processor 22 to create the user's screen. In response to the request for creating the user's screen, the reservation status creation processor 22 accesses the reservation information DB 50 and creates the reservation status screen such as the one shown in FIG. 8 (step 2004). Customer information (customer ID, customer name, telephone number) on other users cannot be referenced on this screen. The created screen is displayed on the user's Internet terminal 1 by the reservation status display processor 23 (step 2005).

Next, the flow of processing performed when an operator checks the reservation status or the reservation request processing status will be described. An operator issues a reservation-request-processing status checking request from the acceptance terminal 5 to the reservation status checking request processor 21, and the reservation status checking request processor 21 receives this checking request (step 2001). In response to the checking request, the reservation status checking request processor 21 checks who has issued the request, a user or an operator (step 2002). If it is found that an operator has issued the request, the reservation status checking request processor 21 requests the reservation status creation processor 22 to create the operator's screen. In response to the request for creating the operator's screen, the reservation status creation processor 22 accesses the reservation information DB 50 and creates the reservation request processing status screen such as the one shown in FIG. 12 (step 2003). Unlike the user's screen, information on all users may also be referenced on this operator's screen. Because multiple operators process requests as shown in FIG. 12, multiple reservation IDs are displayed and two or more reservation requests may be processed in the same time zone. The reservation status display processor 23 displays the reservation request processing status screen, created in step 2003, on the operator's acceptance terminal 5 (step 2005).

Next, the flow of processing performed when the operator selects a request from the screen in FIG. 12 will be described.

Figure 17:
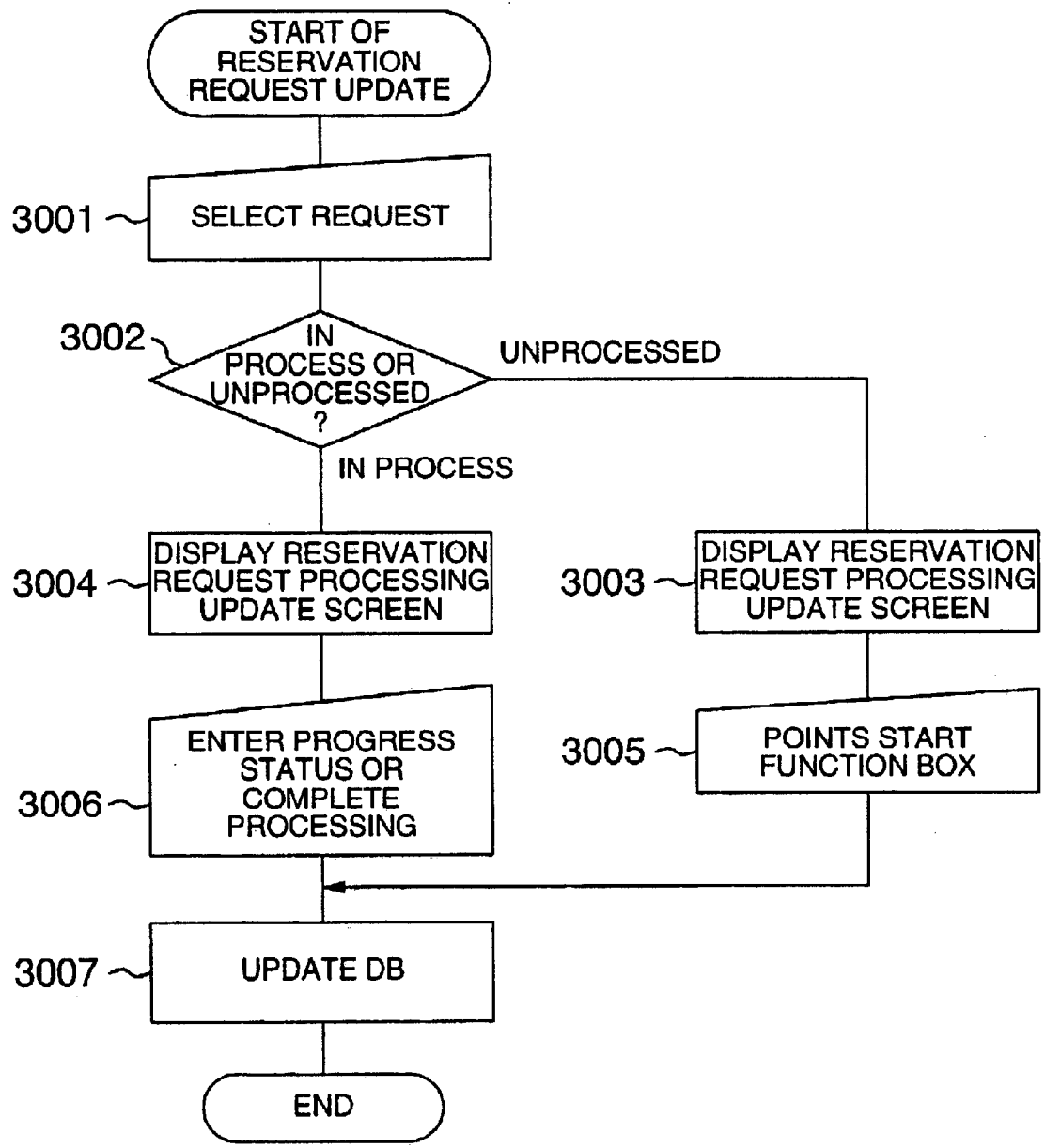
FIG. 17 is an example of a flowchart showing the flow of processing performed when an operator starts processing, reports progress status to date, and completes processing for a reservation request.

FIG. 17 is a flowchart showing how the operator starts processing a reservation request, reports its progress status to date, and completes the processing. In the flowchart, it is assumed that the operator has already issued a reservation status checking request and that the reservation request processing status screen shown in FIG. 12 is displayed on the operator' acceptance terminal 5 according to the procedure indicated by the flowchart in FIG. 16.

From the screen shown in FIG. 12, the operator selects a reservation request 501 whose processing status is to be updated (step 3001). The selected reservation request is passed to reservation-request-processing update request processor 31 to check if the reservation request specified by the update request is unprocessed or in process (step 3002). When the update request is unprocessed, a reservation request processing update screen 600 shown in the top in FIG. 13 is displayed on the operator's acceptance terminal 5 (step 3003). When the update request is unprocessed, the operator points a Start function box 601 to start processing the reservation request (step 3005).

When the reservation request is in process, that is, when an inquiry or a consultation is in process or an investigation is being made, a reservation request processing update screen 604 in the bottom of FIG. 13 is displayed on the operator's acceptance terminal 5 (step 3004). To enter the progress status to date, the operator points an Update data function box 602 and enters the current progress status. When processing is completed, the operator points a Complete function box 603 to end processing for the reservation request (step 3006).

The reservation-request-processing update processor 32 accesses the reservation information DB 50 based on operator-entered data to update the processing status (step 3007).

Next, the following describes how reservation detection processor 41 checks if there is a reservation request that satisfies the reservation condition and, if such a request is found, how the reservation detection processor 41 prompts an operator to call up the user who has made a telephone call.

Figure 18:
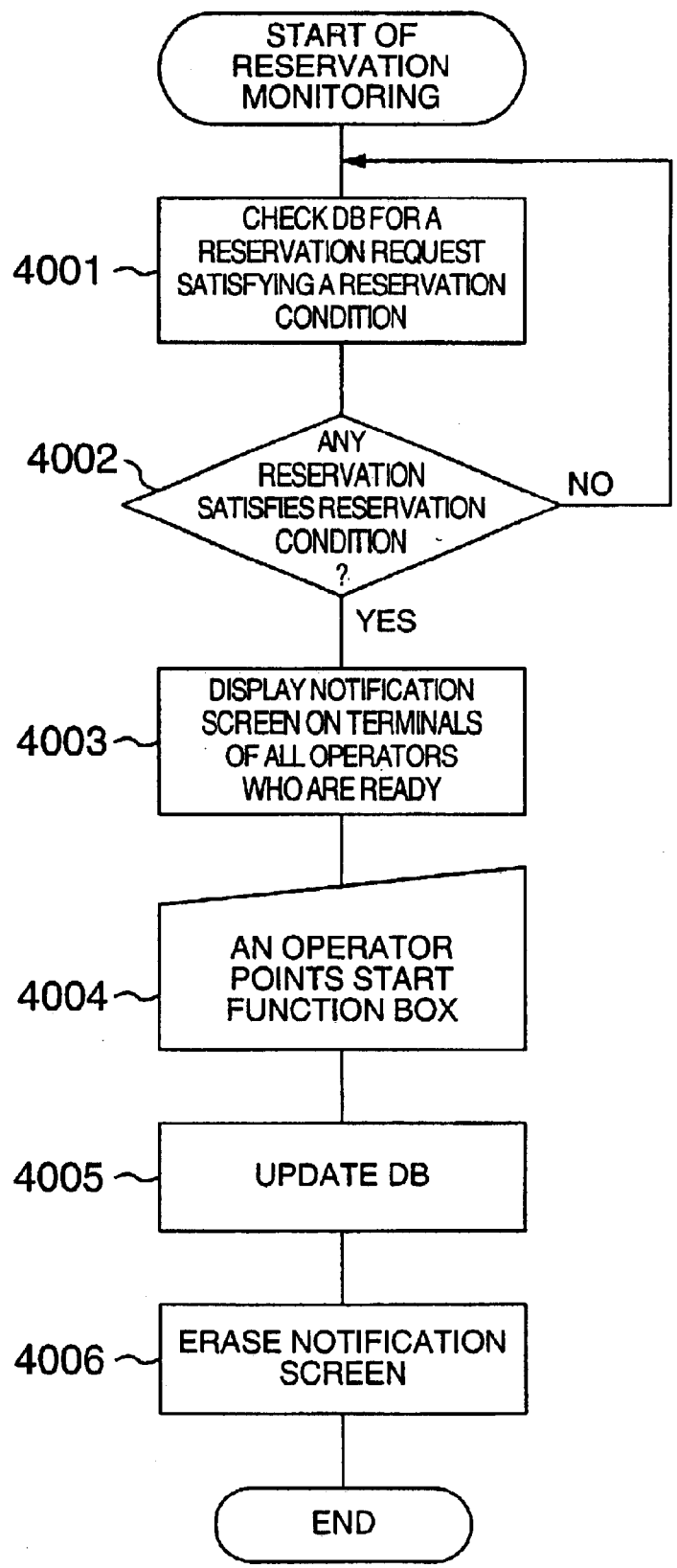
FIG. 18 is an example of a flowchart showing the flow of processing performed when a reservation detection processor detects a reservation request that has reached a user-specified time or that satisfies a specified condition and informs an operator of the reservation request.

FIG. 18 is a flowchart showing the flow of processing performed by the reservation detection processor 41 that detects a reservation request that has reached a user-specified time or satisfies a specified condition and informs an operator of the reservation request.

The reservation detection processor 41 checks the reservation information DB 50 at an interval to check if there is a reservation request that has reached a user-specified time or that satisfies a specified condition (step 4001). If a reservation request that has reached a specified time or that satisfies a specified condition is found (step 4002), the reservation detection processor 41 requests the operator notification processor 42 to notify the operator that there is such a reservation request. In response to this request, the operator notification processor 42 creates a callback notification screen 700, shown in FIG. 14, which sends a message prompting the operator to call up the user who has made the reservation and displays the notification screen on the acceptance terminals 5 of all operators who are ready to process the request (step 4003).

With the reservation ID, customer information (customer ID, name, telephone number), and reservation time displayed on the callback notification screen 700 shown in FIG. 14, an operator points a Start function box 701 and dials the telephone number displayed on the screen to start processing (step 4004). After the operator starts processing, the reservation-request-processing update processor 32 accesses the reservation information DB 50 to update the processing status (step 4005). The operator notification processor 42 erases the notification screen from the acceptance terminals 5 of all operators who are ready to process the request (step 4006) and ends processing.

Although, in the embodiment described above, an operator points the Start function box 701 and dials the telephone number displayed on the screen to start processing, the Start function box 701 may be an automatic dial button.

In the embodiment described above, when there is a reservation request that has reached a specified time or that satisfies a specified condition, the operator notification processor 42 creates the callback notification screen in FIG. 14 to prompt an operator to call up the user who has made the reservation request and displays the notification screen on the acceptance terminals 5 of all operators who are ready to process the request. Instead of this, the operator notification processor 42 may display the notification screen only on the terminals of operators who are free or who are processing a small number of requests.

Next, a second embodiment of the present invention will be described.

Figure 19:
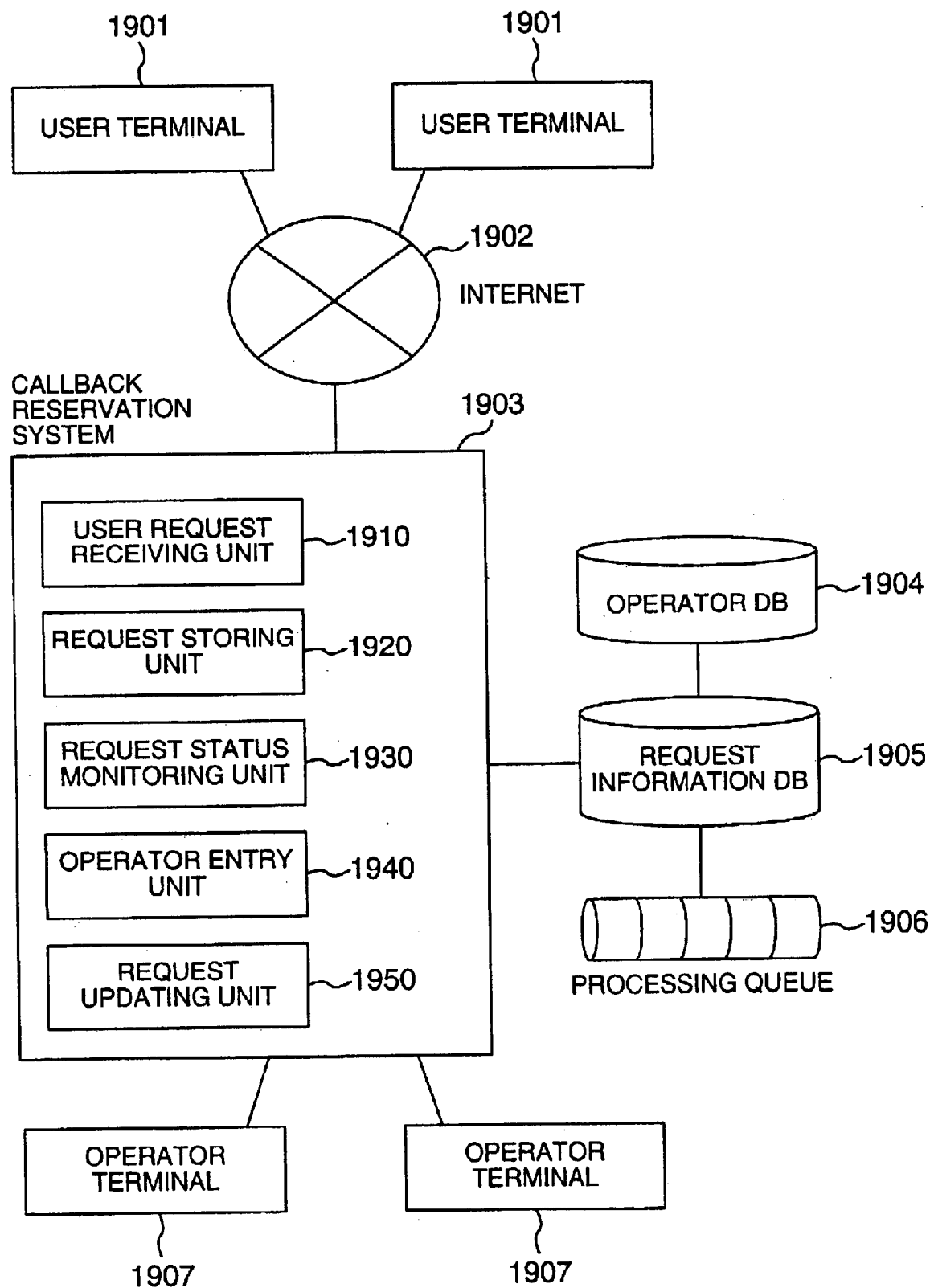
FIG. 19 is a general diagram of a callback reservation system in a second embodiment of the present invention.

FIG. 19 is a general diagram of a callback reservation system in the second embodiment of the present invention. A callback reservation system 1903 is a server that controls and manages callback (return call) reservation requests. The callback reservation system 1903 receives an inquiry or a processing request entered by a user via a user terminal 1901 connected to the Internet 1902 and performs reservation processing. In addition, the callback reservation system 1903 stores all user-entered information in a request information DB (database) 1905 and, based on the stored information, creates a processing queue 1906 in which requests are sequenced according to priority and an operator DB 1904 that manages the work status of the operators. When the callback time of a request arrives according to the sequence in which the requests are stored in the processing queue 1906, the callback reservation system 1903 outputs a reservation request on an operator terminal 1907 to prompt the operator to process the reservation request.

The callback reservation system 1903 comprises functional units including a user request receiving unit 1910, a request storing unit 1920, a request status monitoring unit 1930, an operator entry unit 1940, and a request updating unit 1950. The user request receiving unit 1910 creates a reservation request entry screen for the user and displays the screen on the user terminal 1901. This unit also receives a reservation request entered by the user. The request storing unit 1920 stores a reservation request, received by the user request receiving unit 1910, into the request information DB 1905. This unit also calculates the sequence in which the operators must process the request based on the contents of the request and stores the request in the processing queue 1906. The request status monitoring unit 1930 regularly monitors the processing queue 1906 and the operator DB 1904 and allocates a reservation request to an operator ready for processing it. The operator entry unit 1940 creates a screen through which an operator enters the processing status of a reservation request and displays the screen on the operator terminal 1907. This unit also receives processing status information entered by an operator. In addition, the unit automatically sends a callback to the user who reserved the request. The request updating unit 1950 obtains a reservation request from the request information DB 1905 in response to a request from the operator entry unit 1940 and updates the processing status. The unit also updates the work status of operators stored in the operator DB 1904.

Figure 20:
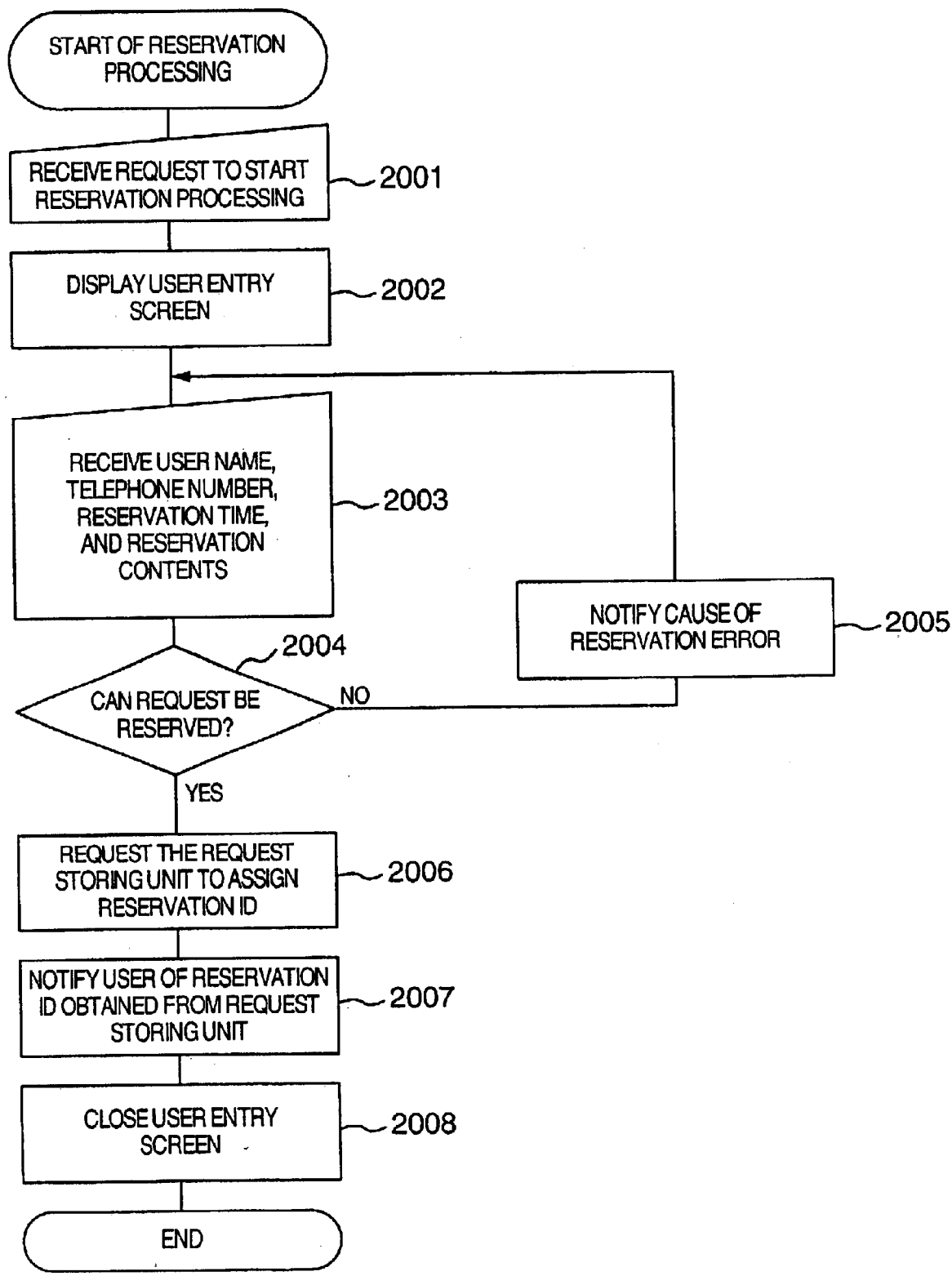
FIG. 20 is a flowchart showing reservation processing executed by a user request receiving unit.

FIG. 20 is a flowchart showing reservation processing executed by the user request receiving unit 1910. In response to a reservation processing start request from the user (step 2001), the user request receiving unit 1910 displays a user entry screen 2201, shown in FIG. 22, on the user terminal 1901 (step 2002). Then, the unit waits for the user to enter the name, telephone number, mail address, reservation request contents, desired callback date/time, and other conditions (step 2003). The unit displays an entry screen on which the user can specify a desired callback date/time in any form (for example, only a date with no time or immediate callback desired) and other conditions freely. When the user presses an OK button 2202 on the user entry screen 2201, the user request receiving unit 1910 ends receiving information and confirms that there is no error and conflict in the entered reservation request information and that the request may be reserved (step 2004).

If an error is detected, for example, if the desired callback date entered by the user is a past date, if the desired end time is earlier than the desired start time, or if a date/time satisfying both the specified date/time and the contents specified for other conditions does not exist, the unit displays an error message on the user terminal 1901 to indicate that there is an error and prompts the user to re-enter information (step 2005). If there is no error and the request may be reserved, the user request receiving unit 1910 requests the request storing unit 1920 to store the entered reservation request into the request information DB 1905 (step 2006) and receives an reservation ID as the return value.

The reservation ID, a unique number assigned to a user-entered reservation request to identify it, is used to easily identify and manage the reservation request in the request information DB 1905 or the operator DB 1904. This ID is also used when a request to change the contents of a reservation request or a request to cancel a reservation request is received from the user. The user request receiving unit 1910 displays the reservation ID, which is notified by the request storing processing (detailed in FIG. 12) of the request storing unit 1920, on the user terminal 1901 to notify the user of it (step 2007), closes the user entry screen 2201 (step 2008), and terminates processing.

Figure 21:
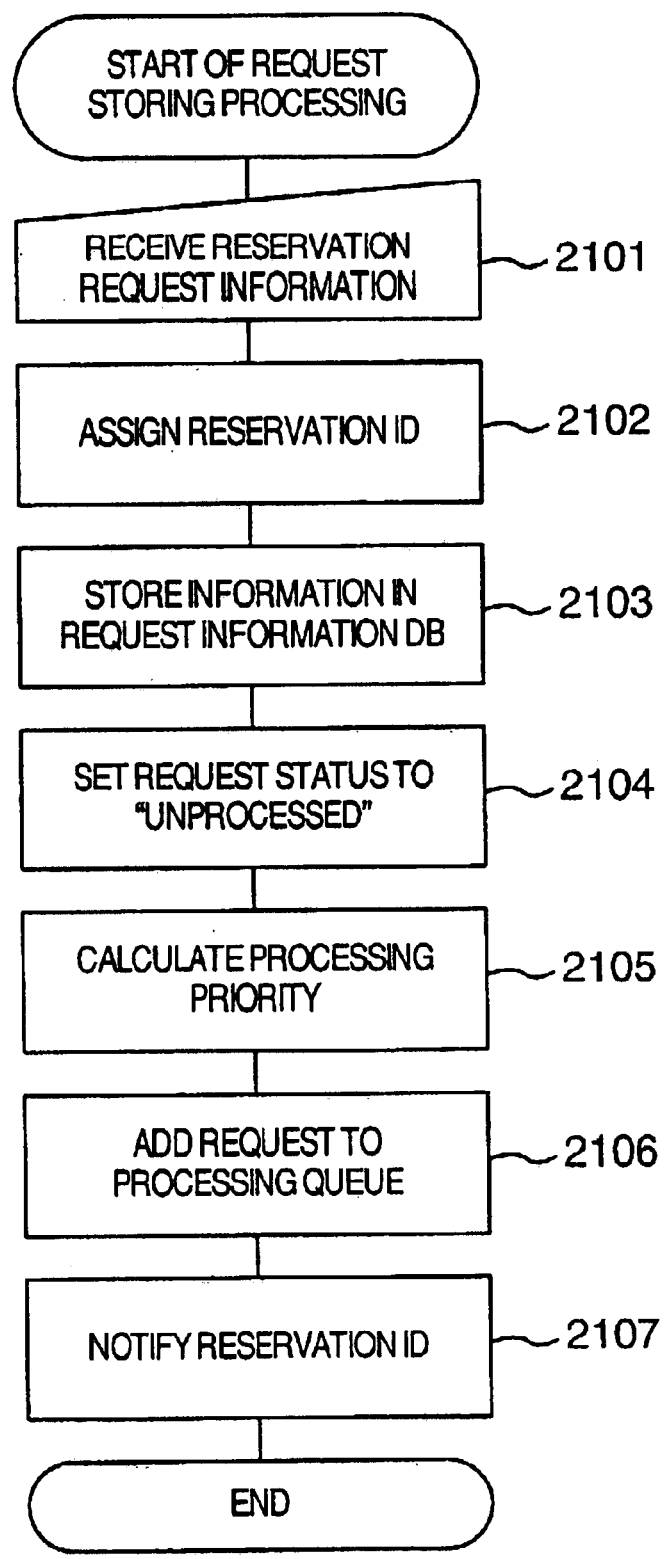
FIG. 21 is a flowchart showing request storing processing executed by a request storing unit.

FIG. 21 is a flowchart showing request storing processing executed by the request storing unit 1920. Upon receiving reservation request information from the user request receiving unit 1910, the request storing unit 1920 starts request storing processing (step 2101). A unique number is assigned to the received reservation request as the reservation ID (step 2102). The reservation request, reservation ID, and current date/time are stored in the request information DB 1905 (step 2103). After storing the information in the request information DB 1905, the request storing unit 1920 sets the contents of a processing status field 2331 of a management table 2301 (FIG. 23) in the request information DB 1905 to "unprocessed" to indicate that the reservation request is not yet processed (step 2104). In addition, the request storing unit 1920 identifies the desired callback date/time of the reservation request and compares it with the desired callback date/time of each of other reservation requests to calculate the processing priority (step 2105). The reservation ID of the reservation request is stored in the processing queue 1906 according to the sequence obtained as the result of calculation (step 2106). The processing queue 1906 specifies the sequence in which any given reservation request is to be processed. All reservation requests are processed according to the sequence specified by the processing queue 1906. The request storing unit 1920 sequentially adds a reservation request to the end of the processing queue 1906 within a range satisfying a user specified condition, based on the desired callback date/time information. This makes it possible for the requests reserved under the same condition to be processed on a first-in first-out basis. After completing all processing described above, the request storing unit 1920 notifies the user request receiving unit 1910 of the reservation ID assigned to the reservation request (step 2107) and terminates the processing.

FIG. 22 shows a screen on which a user's reservation request is received. When the user accesses the callback reservation system 1903, the user request receiving unit 1910 displays the user entry screen 2201 on the user terminal 1901. On the user entry screen 2201, the user name, telephone number, mail address, reservation contents, and desired callback time may be entered. When the user enters the required items and presses the OK button 2202, the request storing unit 1920 starts reservation processing. When the user presses a cancel button 2203, reservation processing is not executed but the user entry screen 2201 is closed.

FIG. 23 shows the format of a management table stored in the request information DB 1905. The management table 2301 classifies each request into four units of information for use in management: date information 2310, user information 2320, operator information 2330, and priority information 2340.

The date information 2310 comprises the date and the time at which a reservation was received. The user information 2320, which is entered by the user through the user entry screen 2201 (FIG. 22), comprises the user name, telephone number, mail address, callback request date/time, request contents, and the reservation ID assigned when the reservation was made. The operator information 2330, which is used for managing the processing status of a callback, comprises the operator name, processing status, callback time, processing duration, processing contents, operator's comment, and remarks. The priority information 2340 indicates the sequence in which the request is stored in the processing queue 1906. A smaller priority number indicates higher processing priority, meaning that the request should be processed sooner.

Out of the classified information described above, the date information 2310, user information 2320, and priority information 2340 are stored by the request storing unit 1920 when a reservation request from the user is received. When a reservation request is received from the user, the processing status field 2331 of the operator information 2330 is set to "unprocessed". After that, when the reservation request is allocated to one of the operators, the request updating unit 1950 updates the processing status field 2331 from "unprocessed" to "in process" and adds information to the operator name field and the callback time field.

When processing for the reservation request is completed, the request updating unit 1950 updates the processing status field 2331 from "in process" to "processed" and adds information to the remaining fields, that is, the processing duration field, processing contents field, operator's comment field, and remarks field.

Figure 24:
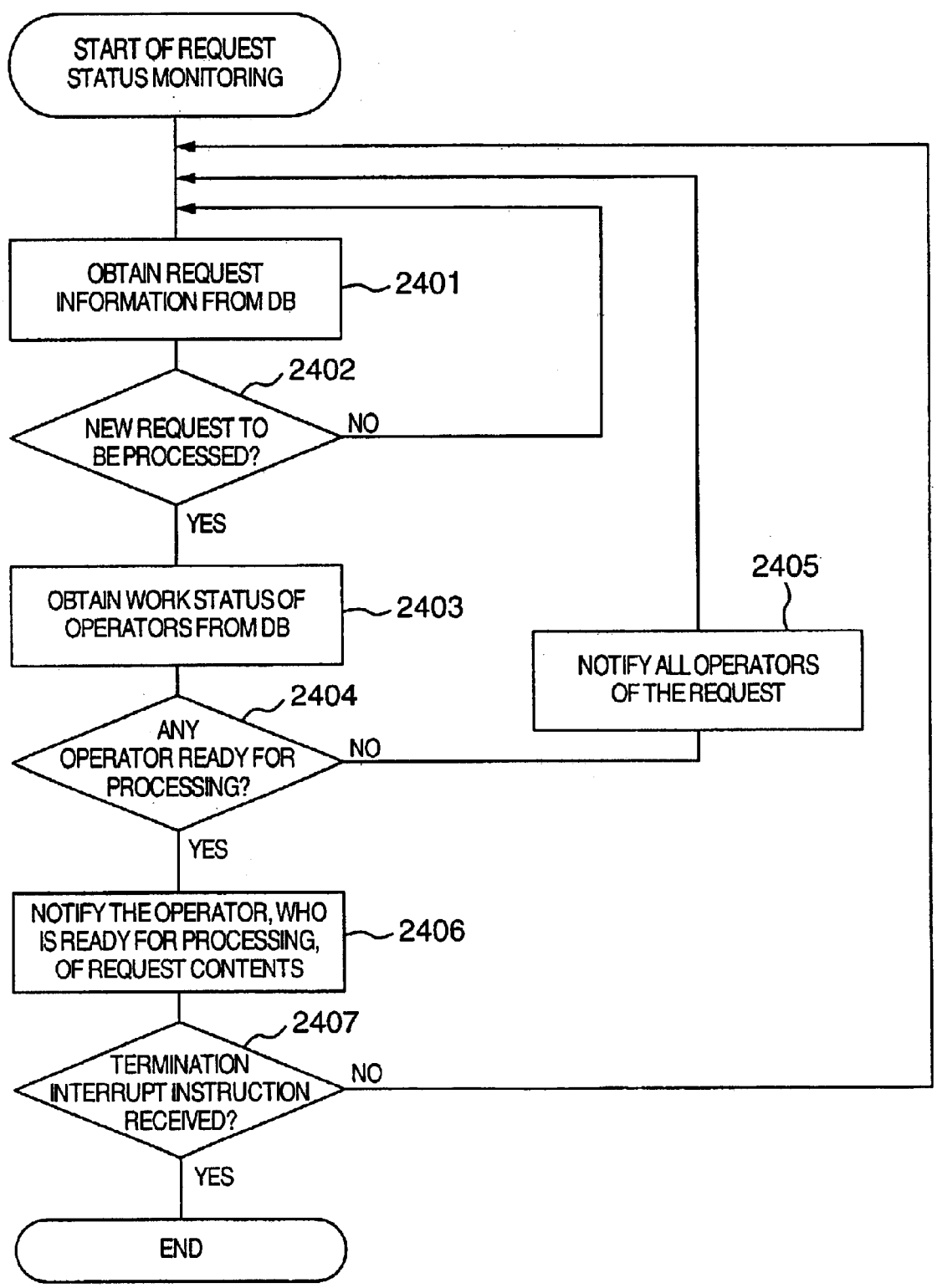
FIG. 24 is a flowchart showing request status monitoring processing executed by a request status monitoring unit.

FIG. 24 is a flowchart showing request status monitoring processing executed by the request status monitoring unit 1930. The request status monitoring unit 1930 continuously checks unprocessed reservation requests, the current time, and the work status of operators to allocate a new reservation request to an operator.

The request status monitoring unit 1930 regularly references the reservation ID at the top of the processing queue 1906, obtains the contents of the reservation request corresponding to the reservation ID from the request information DB 1905 (step 2401) and checks if the current time satisfies the desired callback request condition of the reservation request (step 2402).

If the condition is not satisfied, the unit determines that there is no request to be processed and, at a later time, repeats the same processing. If there is a request to be processed, the unit obtains the work status of operators from the operator DB 1904 (step 2403). The operator DB 1904 (detailed in FIG. 25), a database that manages the operator work status, contains the request processing status of each operator, that is, "ready", "busy", or "not ready".

The request status monitoring unit 1930 checks the obtained work status of operators to see if there is an operator ready for processing the new reservation request (step 2404). If no operator is ready for processing, the unit displays a message on the operator terminal 1907 of all operators (step 2405), indicating that there is a new reservation request.

If at least one operator is ready for processing, the unit displays a message on the operator terminal 1907 of that operator, prompting the operator to process the new reservation request (step 2406). As long as there are reservation requests waiting for processing, the request status monitoring unit 1930 continues operation. Therefore, when a sequence of processing described above ends, the request status monitoring unit 1930 returns to the step (step 2401) of reservation request monitoring processing. Only when the system manager issues a termination instruction, the request status monitoring unit 1930 receives the interrupt instruction to terminate processing (step 2407).

FIG. 25 shows the format of a management table stored in the operator DB 1904 in which the work status of operators is stored. This management table 2501 has entries, one for each operator, for use in checking if the operator is "busy", "ready" or "not ready". The request updating unit 1950 updates the contents of the information when it detects the start of, or the end of, the processing of a reservation request. The request status monitoring unit 1930 references the information to determine to which operator a new reservation request is to be allocated. For an operator whose processing status field contains "busy", the reservation ID of the request being processed and the processing start time are also stored. For a reservation request that has been processed by an operator, the reservation ID of the reservation request is stored as the reservation ID of processed request in order to keep track of the work result of each operator.

Figure 26:
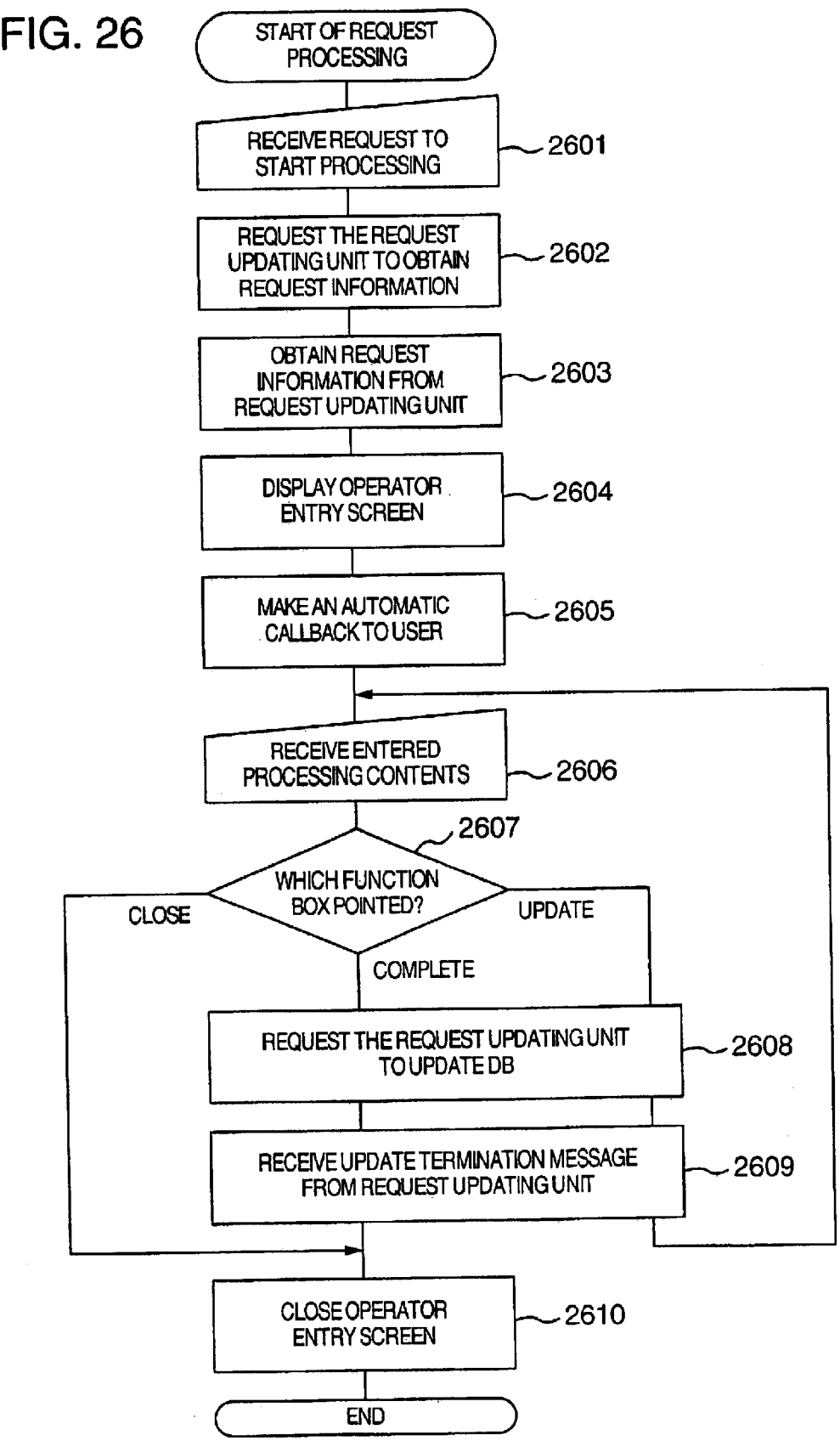
FIG. 26 is a flowchart showing request processing executed by an operator entry unit.

FIG. 26 is a flowchart showing processing executed by the operator entry unit 1940. The operator entry unit 1940 receives from an operator a request to start processing a new reservation request (step 2601) and requests the request updating unit 1950 to obtain the reservation ID of the reservation request, user name, telephone number, and request contents from the management table 2301 in the request information DB 1905 (step 2602). In response to the reservation request information from the request updating unit 1950 (step 2603), the operator entry unit 1940 creates an operator entry screen 2801 (detailed in FIG. 28) based on the received information and displays the screen on the operator terminal 1907 (step 2604). The operator entry unit 1940 automatically makes a callback to the user's telephone number obtained from the request updating unit 1950 to allow the operator to start conversing directly with the user (step 2605). Next, the operator entry unit 1940 waits for the operator to enter information through the operator entry screen 2801. After the operator enters processing contents, the unit waits for the operator to point to one of complete function box 2802, update function box 2803, and close function box 2804 (step 2606).

The operator entry unit 1940 identifies the pointed function box (step 2607). If the operator points to the close function box 2804, control is passed to step 2610. If the operator points to the complete function box 2802 or update function box 2803, control is passed to step 2608. In this case, the operator entry unit 1940 requests the request updating unit 1950 to update the operator DB 1904 and the request information DB 1905 (step 2608). When the operator DB 1904 and the request information DB 1905 are updated, the operator entry unit 1940 receives from the request updating unit 1950 a message indicating that update processing has been terminated (step 2609).

If the operator points to the update function box 2803 in step 2607, steps 2608 and 2609 are executed and then control is passed back to step 2606 to repeat processing. If the operator points to the close function box 2804 or complete function box 2802, the operator entry screen 2801 is closed (step 2610) and the processing is terminated.

Figure 27:
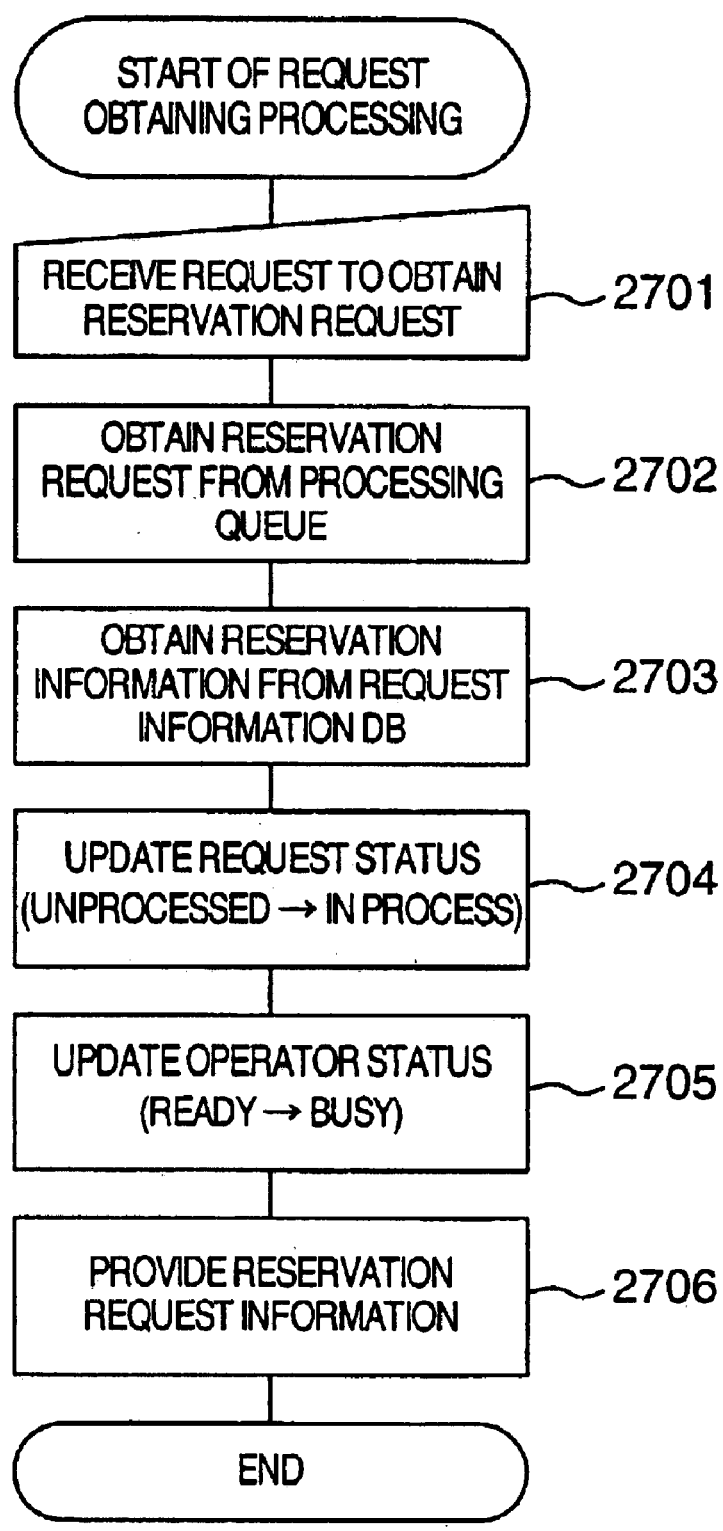
FIG. 27 is a flowchart showing request obtaining processing executed by an request updating unit.

FIG. 27 is a flowchart showing request obtaining processing executed by the request updating unit 1950. Upon receiving from the operator entry unit 1940 a request to obtain information on a reservation request (step 2701), the request updating unit 1950 obtains the reservation ID at the top of the processing queue 1906 (step 2702). The request updating unit 1950 obtains the user name, telephone number, and reservation request contents of the reservation request, which are identified by the reservation ID, from the request information DB 1905 (step 2703). In addition, the unit updates the operator name field, processing status field, and callback time field of the operator information 2330 in the management table 2301 (FIG. 23) stored in the request information DB 1905. At that time, the unit stores the name of a person, allocated as an operator to process the request, in the operator name field, changes the processing status field from "unprocessed" to "in process", and stores the current time in the callback time field (step 2704).

The request updating unit 1950 also updates the following items included in the management table 2501 (FIG. 25) in the operator DB 1904; processing status, reservation ID of request being processed, and the processing start time. When those items are updated, the processing status field is updated from "ready" to "busy", the reservation ID obtained from the processing queue 1906 is stored in the "reservation ID of request being processed" field, and the current time is stored in the processing start time field (step 2705). After that, the request updating unit 1950 returns information on the reservation ID, user name, telephone number, and reservation request, which are obtained from the request information DB 1905, to the operator entry unit 1940 that is the requesting unit of the reservation request information (step 2706).

FIG. 28 shows a screen (displayed in step 2604) through which an operator enters the result of processing executed for a reservation request. This operator entry screen 2801 is created by the operator entry unit 1940, and the reservation ID of the corresponding request, user name, and request contents are displayed thereon. The screen also allows the operator to enter the operator name, processing contents, and processor's comment.

When processing for a reservation request is completed, the operator points to the complete function box 2802. In this case, the entered contents are stored in the request information DB 1905 and the operator DB 1904 and, after that, the operator entry screen 2801 is closed. When the operator points to the update function box 2803, the entered contents are stored in the request information DB 1905 and the operator DB 1904 and, after that, the screen remains enabled for receiving information. When the operator points to the close function box 2804, the operator entry screen 2801 is closed without storing the entered contents in the operator DB 1904 and the request information DB 1905.

Figure 29:
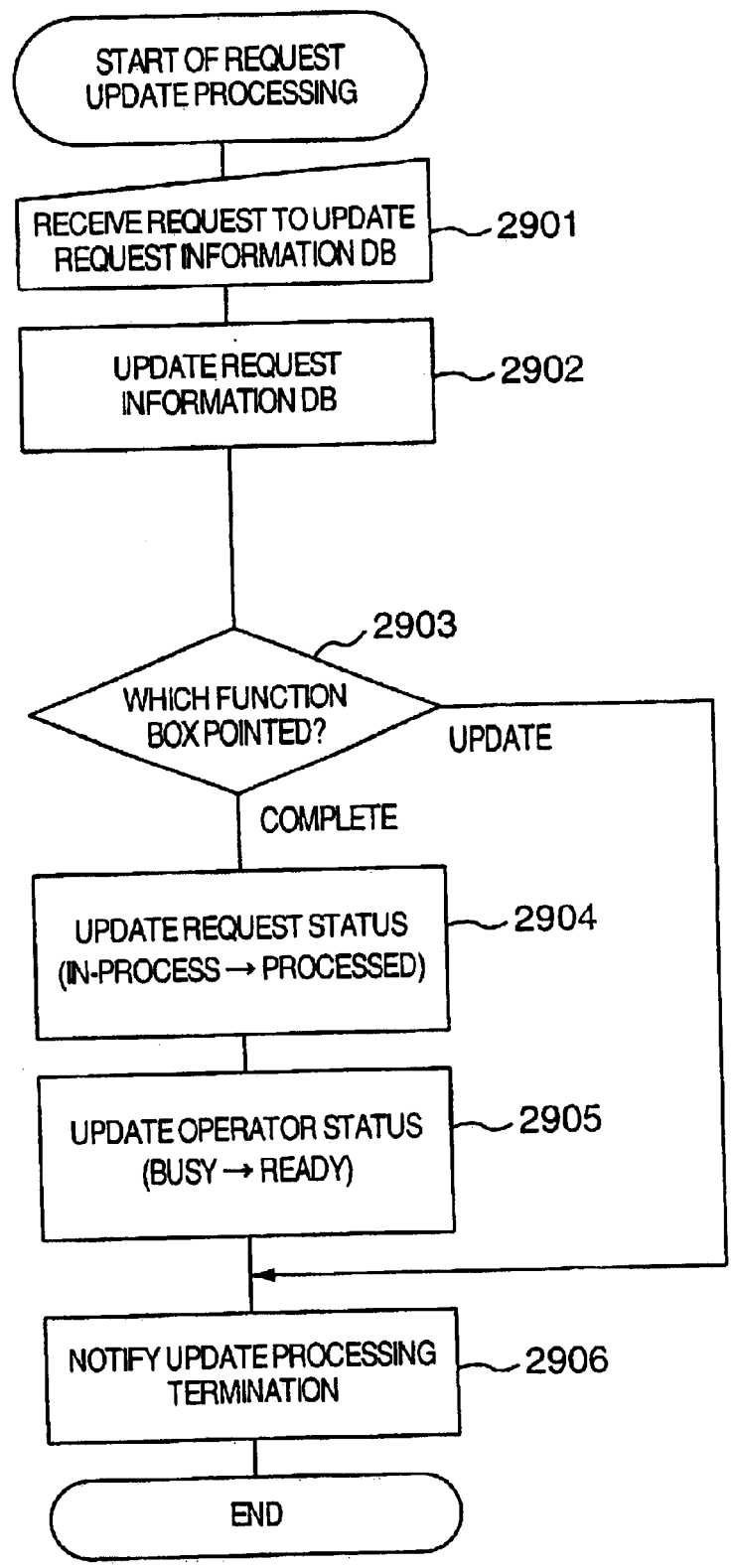
FIG. 29 is a flowchart showing request updating processing executed by a request updating unit.

FIG. 29 is a flowchart showing request update processing executed by the request updating unit 1950. When the operator points to the complete function box 2802 or the update function box 2803 on the operator entry screen 2801 (FIG. 28), the request updating unit 1950 receives from the operator entry unit 1940 a request to update the operator DB 1904 and the request information DB 1905 with the processing contents entered through the screen (step 2901). The request updating unit 1950 reflects the information, which is received from the operator entry unit 1940—that is, the operator name, processing contents, and operator's comments—on the request information DB 1905 for updating the DB (step 2902). The unit checks if the function box pointed on the operator entry screen 2801 is the complete function box 2802 or the update function box 2803 (step 2903).

If the operator pointed to the update function box 2803, control is passed to step 2906. If the operator pointed to the complete function box 2802, the processing status field 2331 field of the management table 2301 (FIG. 23) in the request information DB 1905 is updated from "in process" to "processed" (step 2904) and the processing status field of the management table 2501 (FIG. 25) of the operator DB 1904 is updated from "busy" to "ready" (step 2905). After updating the databases, the request updating unit 1950 notifies the operator entry unit 1940 that the databases have been updated correctly (step 2906) and then terminates the processing.

As described above, the system according to the present invention allows a user, who wants to receive a telephone inquiry or consultation service, to make a callback reservation, eliminating the need for the user to repeatedly make a call even when the telephone operator is busy. Thus, the user can receive a telephone inquiry service or consultation service at a user-specified time and under a user-specified condition.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A callback reservation system in which a user makes a reservation by telephone, the callback reservation system comprising:

a reservation acceptance unit which accepts a callback reservation from a user, the reservation specifying a reservation time and/or a reservation condition;

a request registering unit which registers information concerning a reservation request accepted in the reservation acceptance unit to a request information database;

an allocation unit which detects a reservation request reaching the reservation time specified by the user and/or a reservation request satisfying the condition specified by the user and allocates the detected request to an operator ready for processing the request; and a notification unit which notifies the allocated operator of contents of the detected reservation request.

2. A callback reservation system in which a user makes a reservation by telephone, the callback reservation system comprising:

a reservation acceptance unit which accepts a callback reservation from a user, the reservation specifying a reservation time and/or a reservation condition;

a request registering unit which registers information concerning a reservation request accepted in the reservation acceptance unit to a request information database;

an operator management table which stores the work status of a plurality of operators as to whether each operator is currently busy, ready or not ready;

an allocation unit which reads a reservation request registered in the request information database, checks if the read reservation request reaches the user specified reservation time and/or satisfies the user specified reservation condition, and allocates the reservation request to a relevant operator ready for processing the request by referring to the operator management table, when the check result is that the read reservation request reaches the user specified reservation time and/or satisfies the user specified reservation condition; and a notification unit which notifies the allocated operator of contents of the read reservation request.

3. A callback reservation system according to claim 1, wherein the request registering unit compares a reservation time and/or a reservation condition of a reservation request to be registered with a reservation request already registered, determines priority of the reservation requests and registers the reservation requests to an operator queuing request queue according to the determined priority; and the allocation unit reads and processes a reservation request from the operator queuing request queue based on the determined priority.

4. A callback reservation method in which a user makes a reservation by telephone, comprising:

accepting a callback reservation from a user, the reservation specifying a reservation time and/or a reservation condition;

registering information concerning the accepted reservation request to a request information database;

detecting a reservation request reaching the reservation time specified by the user and/or a reservation request satisfying the condition specified by the user and allocating the detected request to an operator ready for processing the request; and notifying the allocated operator of contents of the detected reservation request.

5. A callback reservation method in which a user makes a reservation by telephone, comprising:

accepting a callback reservation from a user, the reservation specifying a reservation time and/or a reservation condition;

registering information concerning the accepted reservation request to a request information database;

storing in an operator management table the work status of a plurality of operators as to whether each operator is currently busy, ready or not ready to manage the work status of the operators;

reading a reservation request registered in the request information database, and checking if the read reservation request reaches the user specified reservation time and/or satisfies the user specified reservation condition;

allocating the reservation request to a relevant operator ready for processing the request by referring to the operator management table, when the check result is that the read reservation request reaches the user specified reservation time and/or satisfies the user specified reservation condition; and notifying the allocated operator of contents of the read reservation request.

* * * * *